United States Patent [19]

Sluijter et al.

[11] Patent Number: 5,055,997
[45] Date of Patent: Oct. 8, 1991

[54] SYSTEM WITH PLURALITY OF PROCESSING ELEMEMTS EACH GENERATES RESPECTIVE INSTRUCTION BASED UPON PORTIONS OF INDIVIDUAL WORD RECEIVED FROM A CROSSBAR SWITCH

[75] Inventors: Robert J. Sluijter; Cornelis M. Huizer; Hendrik Dijkstra, all of Eindhoven, Netherlands

[73] Assignee: U.S. Philips Corporation, New York, N.Y.

[21] Appl. No.: 595,720

[22] Filed: Oct. 9, 1990

Related U.S. Application Data

[63] Continuation of Ser. No. 285,187, Dec. 15, 1988, abandoned.

[30] Foreign Application Priority Data

Jan. 13, 1988 [NL] Netherlands ............... 8800071

[51] Int. Cl.⁵ .................................. G06F 15/80
[52] U.S. Cl. ....................... 364/200; 364/228.7; 364/229; 364/231.9; 364/238.1; 364/261; 364/261.1; 364/736; 382/41
[58] Field of Search ............... 364/736, 200 MS File, 364/900 MS File; 382/41

[56] References Cited

U.S. PATENT DOCUMENTS

| | | | |
|---|---|---|---|
| 3,718,912 | 2/1973 | Hasbrouck et al. | 364/200 |
| 3,970,993 | 7/1976 | Finnila | 364/200 |
| 4,095,278 | 6/1978 | Kihara | 364/900 |
| 4,109,311 | 8/1978 | Blum et al. | 364/200 |
| 4,236,204 | 11/1980 | Groves | 364/200 |
| 4,293,907 | 10/1981 | Huang et al. | 364/200 |
| 4,467,409 | 8/1984 | Potash et al. | 364/200 |
| 4,783,738 | 11/1988 | Li et al. | 364/200 |
| 4,807,183 | 2/1989 | Kung et al. | 364/900 |
| 4,831,572 | 5/1989 | Sekiguchi | 364/200 |
| 4,884,193 | 11/1989 | Lang | 364/200 |
| 4,907,148 | 3/1990 | Morton | 364/200 |

OTHER PUBLICATIONS

Annaratone et al. "Warp Architecture and Implementation", 13th Annual Symposium on Computer Architecture, Jun. 1986, Tokyo.

*Primary Examiner*—Thomas C. Lee
*Attorney, Agent, or Firm*—Michael E. Marion

[57] ABSTRACT

A data processor system having at least one arithmetic/logic processor element and at least one memory processor element which can be coupled in circuit using a crossbar switch. The arithmetic/logic processor element is provided with an ALU and a program memory. The ALU has an input for instructions. The instructions can be made up of data from the program memory and data from the crossbar switch via a channel specifically present for the purpose.

16 Claims, 3 Drawing Sheets

SYSTEM WITH PLURALITY OF PROCESSING ELEMEMTS EACH GENERATES RESPECTIVE INSTRUCTION BASED UPON PORTIONS OF INDIVIDUAL WORD RECEIVED FROM A CROSSBAR SWITCH

This is a continuation of application Ser. No. 07/285,187, filed Dec. 15, 1988, now abandoned.

BACKGROUND OF THE INVENTION

The present invention relates to a data processor system for processing data presented in digital form, provided with at least one data processor unit which comprises at least one processor module having processor elements which operate in parallel in time, including at least one arithmetic and/or logic processor element and at least one memory processor element, and a reconfigurable switching matrix (crossbar switch) to which input signals for the processor module and output signals from the processor elements belonging to the respective processor module can be fed and from which input signals for the processor elements belonging to said processor module and output signals of said processor module can be obtained, the arithmetic and/or logic processor element being provided, moreover, with an ALU (arithmetic and/or logic element) and a program memory, and the ALU having a first and a second input (P and Q respectively) via which data can be fed, and a third input (I) via which instructions can be fed in for the operations to be executed in the ALU relating to the data fed in.

The article entitled "Warp Architecture and Implementation" by M. Annaratone et al from the "13th Annual symposium on computer architecture, June 1986, Tokyo (Japan)" discloses a "systolic array computer (Warp)" in which a row of processor units is present and each processor unit is provided with at least one arithmetic and logic processor element and at least one memory processor element, a crossbar switch furthermore being present to which, via a buffer circuit, input signals for a processor unit and output signals from the processor elements belonging to the respective processor unit can be fed and from which input signals for processor elements belonging to said processor unit and output signals from said processor unit can be obtained. The arithmetic and logic processor element is provided in the usual manner with an ALU in order to be able to execute diverse arithmetic and logic operations, a separate arithmetic processor element (multiplier) being present to execute multiplications.

From the point of view of simplicity, it is desirable to define beforehand in the programs in the respective program memories at which instant which operations take place in the processor elements; more particularly, this is desirable if the data processor system is used in installations operating on a real-time basis, such as, for example, video processor systems. A condition for this is, however, that the programs are formed by fixed cycles of branch-free instructions as a result of which the latter do not make any conditional operations possible. This is found to be a serious drawback which appreciably limits the possible applications of the data processor system.

SUMMARY OF THE INVENTION

The object of the invention is to provide a data processor system in which, while retaining programs formed by a fixed cycle of branch-free instructions in the respective program memories, conditional operations can nevertheless be executed.

According to the invention, in order to achieve said object, the data processor system as described in the introduction has the characteristic that the arithmetic and/or logic processor element incorporates a combinatorial network with the aid of which the instructions for the operations to be executed in the ALU are determined from words stored in the program memory and data words fed in from the crossbar switch via a channel specifically present for that purpose. More particularly, a first instruction part is determined in the combinatorial network by an equally long first section of a respective word stored in the program memory and an equally long data word part which is derived from a data word fed in from the crossbar switch, the remaining instruction part being formed by the remaining section of the respective word stored in the program memory.

The invention makes it possible that, in addition to the usual input of instructions from the program memory to the ALU, there is now also the possibility of replacing instruction parts by data word parts which are derived from data words fed in from the crossbar switch and even to modify said data word parts controlled from the program memory. With the aid of the instruction parts determined by the data words fed in from the crossbar switch, conditions can be created which result in the execution of conditional operations in the ALU.

The data processor system described in the introduction has an architectural hierarchy in three levels, viz. data processor units, processor modules and processor elements. As a result of this, a modular and generalized framework becomes possible in which a multiplicity of operations can be executed simultaneously. If several data processors are present, they can be connected in a series, a parallel and/or a fed-back configuration. Each data processor unit may be provided with several, preferably three, processor modules and is preferably constructed as a separate integrated circuit. Each processor module may comprise several, for example three, arithmetic and/or logic processor elements and several, for example two, memory processor elements, while a gate processor element is furthermore present in addition at the input or the output of the processor module. Each processor module is, moreover, provided with a crossbar switch which can be formed, for example, by the input circuits of the processor elements. Each processor element has its own control element with program memory in which the program for the respective processor element is accommodated. Stored in the program memory is a fixed cycle of branch-free instruction words, for example a maximum of sixteen, with the aid of which operations can be carried out in the respective processor element. The same cycle of instruction words is always generated in each of the program memories; said cycles may have a different length for the different program memories. By means of a reset signal it is possible to achieve the result that the first instruction words of the respective cycles of all the program memories are generated at one and the same instant. The crossbar switch is controlled from the program memories belonging to a processor module. If the program memory is formed by a RAM memory, this is loaded in an initiation process. With the exception of the initiation bus necessary therefor, no further control bus is present in the data processing units, apart from a reset signal conductor which may, however, be assigned to the initiation bus.

Conflicts may arise as a result of the nature of the crossbar switch and the programming of the various processor elements; if, for example, information which is intended for one and the same input of a processor element appears at the output of two processor elements at the same time, such a conflict is produced. An effective solution for such conflicts is given in U.S. Pat. No. 4,521,874 in which a buffer register is provided at each of the switch points of a crossbar switch. This solution is relatively expensive and takes up a large chip surface. In another solution, each processor module comprises as many so-called silo registers as the crossbar switch has outputs; the data is written into said silo registers in a fixed sequence but is read out in a sequence determined by the program in the program memory of the respective processor element. As a result of this, the drawback of the solution in the abovementioned U.S. patent is avoided, although flexibility is to some extent lost.

The arithmetic and/or logic processor element may be provided with two shift units (for example, "barrel shifters") in which the data words fed in from the crossbar switch can be subjected to a shift operation and from which the output data words are fed to the first or second data input respectively of the ALU in the respective processor element. In a particular embodiment according to the invention, the arithmetic and/or logic processor element comprises a third shift unit in which data word parts which are fed to the combinatorial network are selected from the data words fed in from the crossbar switch.

The invention also makes it possible to make the arithmetic and/or logic processor elements suitable for executing conditional operations without the program in the program memory of the arithmetic and/or logic processor elements losing its cyclic and unbranched nature and becoming more complicated. After the description of the figures, there follow diverse examples of such conditional operations.

The invention further relates to a video processor system for processing video signal samples on a real-time basis, provided with a data processor system as described above, in which the clock device for controlling the data processor units has a frequency which has a fixed relationship to the frequency with which the video signal samples are obtained.

BRIEF DESCRIPTION OF THE DRAWINGS

The invention will now be explained in more detail with reference to the accompanying drawings, in which.

DETAILED DESCRIPTION OF THE INVENTION

The invention is in no way restricted to the exemplary embodiment described with reference to the drawings; this preferred embodiment serves only to illustrate the invention.

Figure 1:
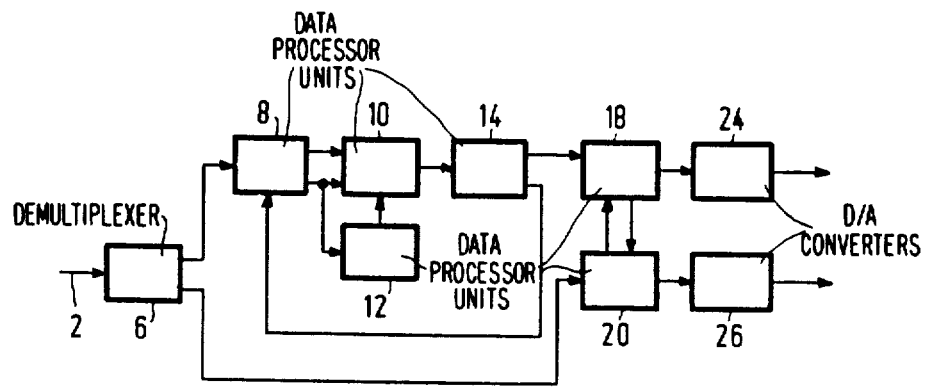
FIG. 1 shows an example of a data processor system according to the invention.
Figure 1:
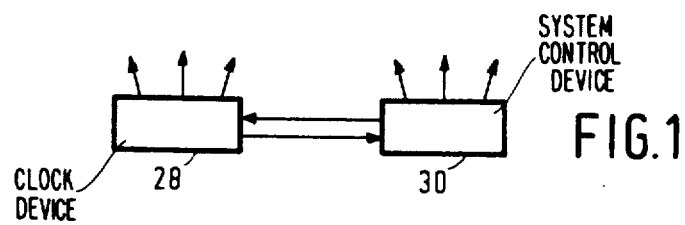

FIG. 1 gives an example of a data processor system according to the invention. Data presented in digital form appears at the input 2 thereof. Said data is distributed over two inputs by a demultiplexer 6 according to a predetermined distribution. As a result, each substream of data words can be processed at a lower frequency than that at which the complete stream of data words is fed in so that data can be processed which could otherwise probably not be processed as a result of an excessively high data supply frequency. Connected to the uppermost output of the demultiplexer 6 is a data processor unit 8 which executes a first operation. The results are fed via two outputs to a data processor unit 10 and, via one of these two, in addition to a data processor unit 12. The results from the data processor unit 12 are also processed in the data processor unit 10. The output of the data processor unit 10 is connected to a data processor unit 14. From the latter, operation results appear on two outputs of the data processor unit 14. The results from the lowermost output are fed back to the data processor unit 8, as a result of which a recursive operation becomes possible. The uppermost output of the data processor unit 14 is connected to a data processor unit 18. The lowermost output of the demultiplexer 6 is connected to a data processor unit 20. The data processor units 18 and 20 are connected to each other bidirectionally. In this manner, the two parts of the input signal can be processed in different manners, a recorrelation being possible as a result of this mutual connection. The results of the process which has taken place in the entire data processor system appear at the outputs of the data processor units 18 and 20. Obviously, the diverse data processor units can be connected in all the other kinds of possible series, parallel and/or fed-back configurations.

Moreover, it is possible to make the data processor units communicate with separate memories. It is also possible to provide A/D or D/A converters respectively at the input and outputs, for instance, for use in a video processor system in which the signals fed in are formed by video signals which are then sampled and digitalized at a frequency which has a fixed relationship to the clock frequency of the data processor system, it then being possible for the outputs to be fed to display and/or image recording means. The abovementioned memories with which the data processor units are able to communicate, can then be used, for example, as a frame memory.

FIG. 1 furthermore indicates two more subsystems 28 and 30 for providing the general control. The subsystem 28 forms a clock device in which clock signals are generated to control the abovementioned units. The subsystem 30 forms a system control device and may, for example, execute reprogramming operations on the respective data processor units. The subsystems 28 and 30 are connected to each other bidirectionally. The subsystem 30 has at the same time the facility (not shown in the figure) for receiving signals from outside the system, for example, to initiate said reprogramming. For the sake of simplicity, the further connections of the subsystems 28 and 30 are not depicted.

Figure 2:
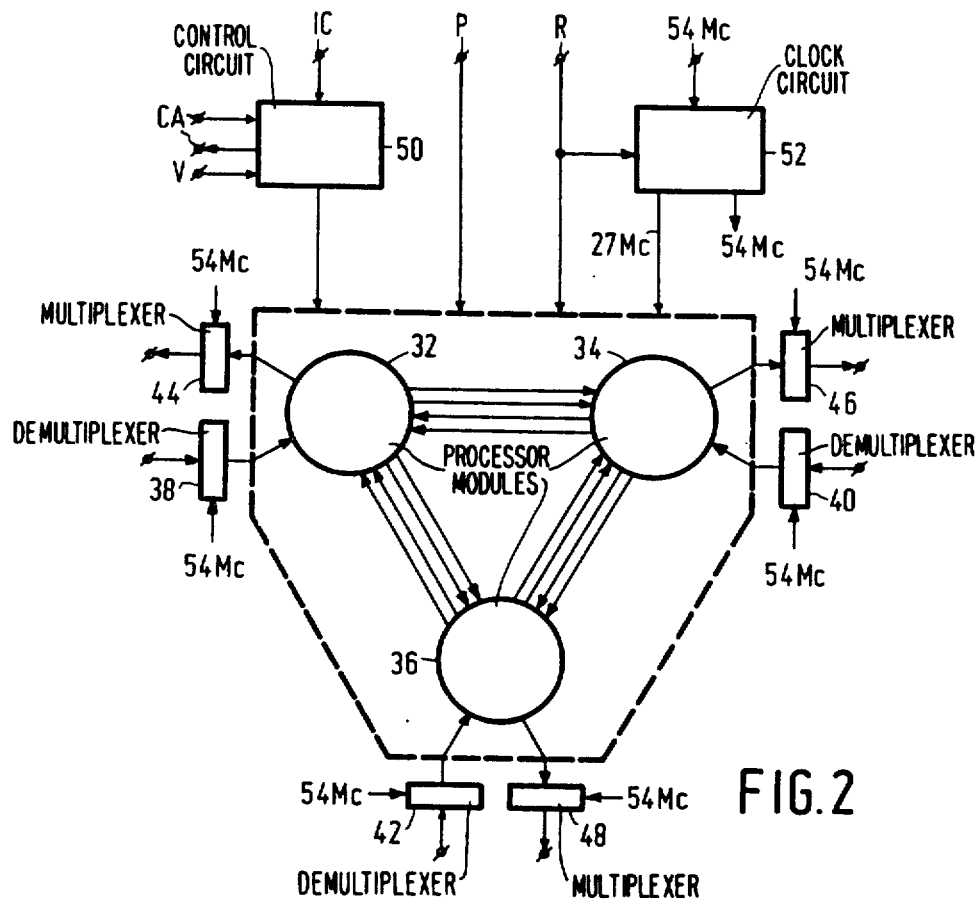
FIG. 2 shows an example of the structure of one single processor unit.

FIG. 2 gives an example of the structure of one single data processor unit. Such a data processor unit is realised as one integrated circuit (chip) in CMOS technology, the processor modules surrounded by a broken line being controlled, in this exemplary embodiment, by a 27

MHz clock signal. Within the data processor unit there are three processor modules 32, 34 and 36 which are directly connected to each other bidirectionally. Although this will also be advantageous with a larger number of processor modules it will not always be realisable because, as the number of processor modules increases, the number of interconnections rapidly becomes larger and a correspondingly larger chip surface is taken off. In the embodiment shown, each processor module has five input channels and five output channels of 12 bits each. Of these, one input and output channel in each case provides the contact with, perhaps, other data processor units or other types of unit. The chip depicted in FIG. 2 further comprises three data gates each with a demultiplexer 38, 40 and 42 respectively, and a multiplexer 44, 46 and 48 respectively, while, finally, a chip initiation control circuit 50 and a clock circuit 52 are also present. As already stated, the processor modules operate at a frequency of 27 MHz; in the clock circuit 52, this frequency is derived from a 54 MHz clock signal fed to the chip. The clock signal is used here to control the multiplexers and demultiplexers in the data ports and, specifically, to convert the 12-bit/27 MHz data provided by the processor modules into 6-bit/54 MHz data and, vice versa, to convert 6-bit/54 MHz data into 12-bit/27 MHz data to be fed to the processor modules. The contact with other possible data processor units and other types of units then proceeds via 6-bit/54 MHz channel. This provision, which is optional has the advantage that the number of external connections to the chip are severely limited. The 27 MHz clock signal is derived from the 54 MHz clock signal in the clock circuit 52 with the aid of a scale-of-two circuit, the phase of the 27 MHz clock signal being monitored by a reset signal R which is fed not only to all the processor modules on the chip, but also to the clock circuit 52. The chip initiation control circuit 50 has a clock and serial data input and a clock and serial data output connected to each processor module. Said clock and serial data which is fed to the processor modules via the circuit 50, is indicated by IC. The chip initiation control circuit 50 is furthermore provided, in a serpentine configuration, with an 8-bit serial chip address CA and a chip address valid signal V. If several data processor units, i.e. several chips, are present, the various chip addresses CA are introduced in a first initiation phase via a serpentine line, as a result of which each chip has become identifiable. If the CA address supplied is that for the respective chip, then this is indicated with the aid of the chip address valid signal V. The serpentine line comprises shift registers which are connected in series and which are present in each data processor unit in the initiation control circuit 50. In the second initiation phase the address, entrained via the IC bus, of a respective data processor unit is compared with the chip address CA introduced via the serpentine line, and if they match, the initiation data including the addressing of the processor elements inside the data processor unit and the addressing of the program memory inside a processor element are transmitted by the initiation control circuit 50. Apart from the power connections P, 3×6 data input connections, 3×6 data output connections, one clock connection, one reset signal connection, two IC connections and three connections for the chip addressing are present on the chip for the initiation data; the chip therefore contains 43 connection pins, apart from the power connections.

Figure 3:
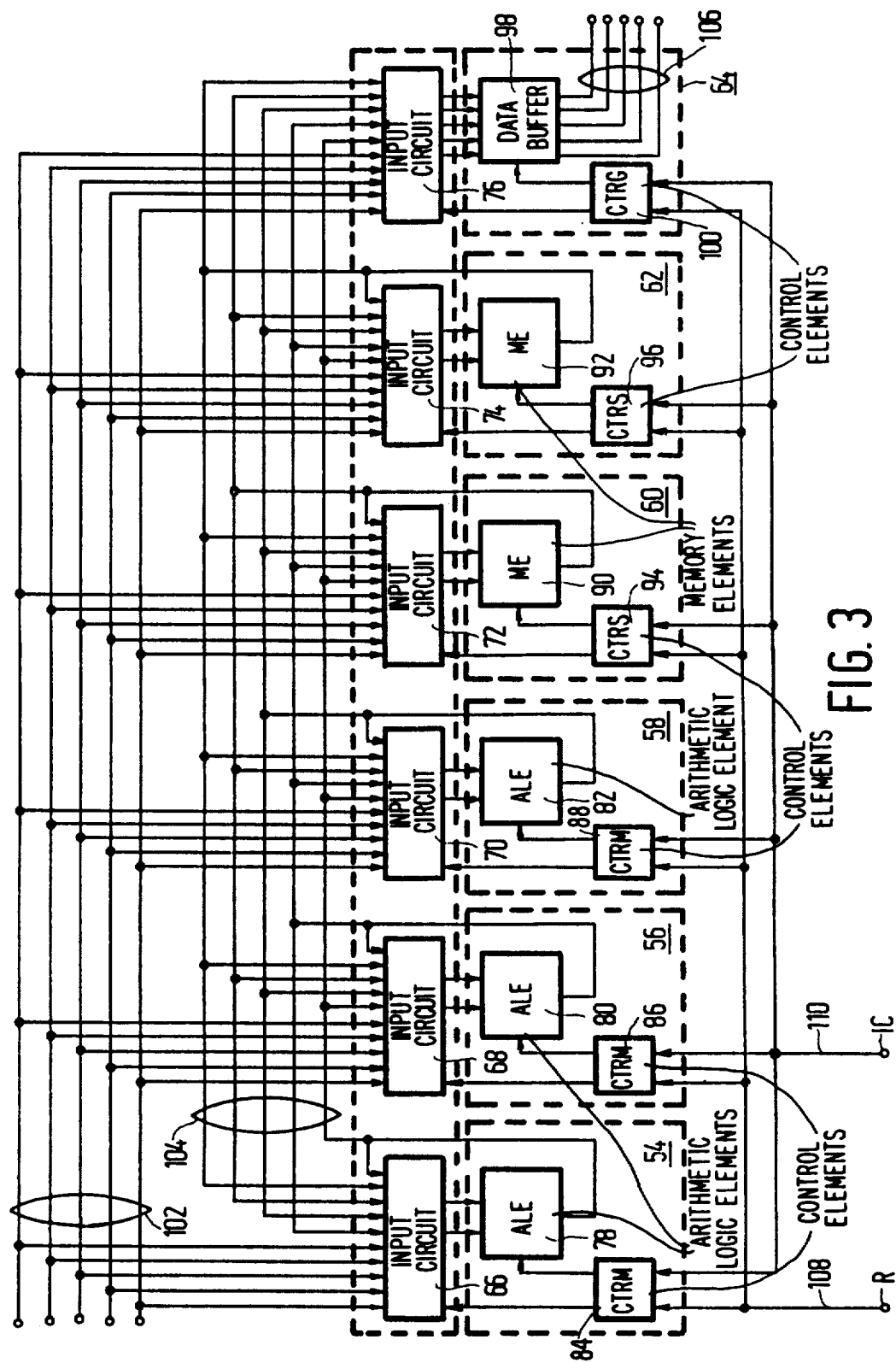
FIG. 3 shows a possible structure of one single processor module.

FIG. 3 depicts the structure of one single processor module. Here this comprises three identical processor elements (MILL) 54, 56 and 58 for performing arithmetic and logic operations, two identical processor elements having a memory function 60 and 62 and an output gate processor element 64. Each of these elements is connected to an input circuit 66, 68, 70, 72, 74 and 76 respectively. These input circuits together form a crossbar switch. The MILL processor elements comprise an arithmetic and logic element (ALE) 78, 80 and 82 respectively, and a control element CTRM 84, 86 and 88 respectively. The memory processor elements comprise a memory element (ME) 90 and 92 respectively and a control element (CTRS) 94 and 96 respectively. The output gate processor element comprises an output data buffer 98 and a control element (CTRG) 100. The processor module input signals are fed to the crossbar switch via the five 12-bit channels 102 and the output signals from the processor elements belonging to the respective processor module via the five 12-bit channels 104. Processor module output signals are obtained from the crossbar switch via five 12-bit channels 106. Furthermore, a connection 108 is indicated for the reset signal R to the control elements 84, 86, 88, 94, 96 and 100, and also the two-wire clock and serial data (IC) connection 110 to all said control elements. It will furthermore be clear that, instead of the output gate processor element 64, an input gate processor element with the same function can also be used; for the diverse processor modules connected to each other, a buffer is present in both cases between every two processor modules. The various input circuits are controlled from the respective control elements. The distribution of the data stream over the respective data processor units therefore takes place simply and solely from the above-mentioned control elements.

Figure 4:
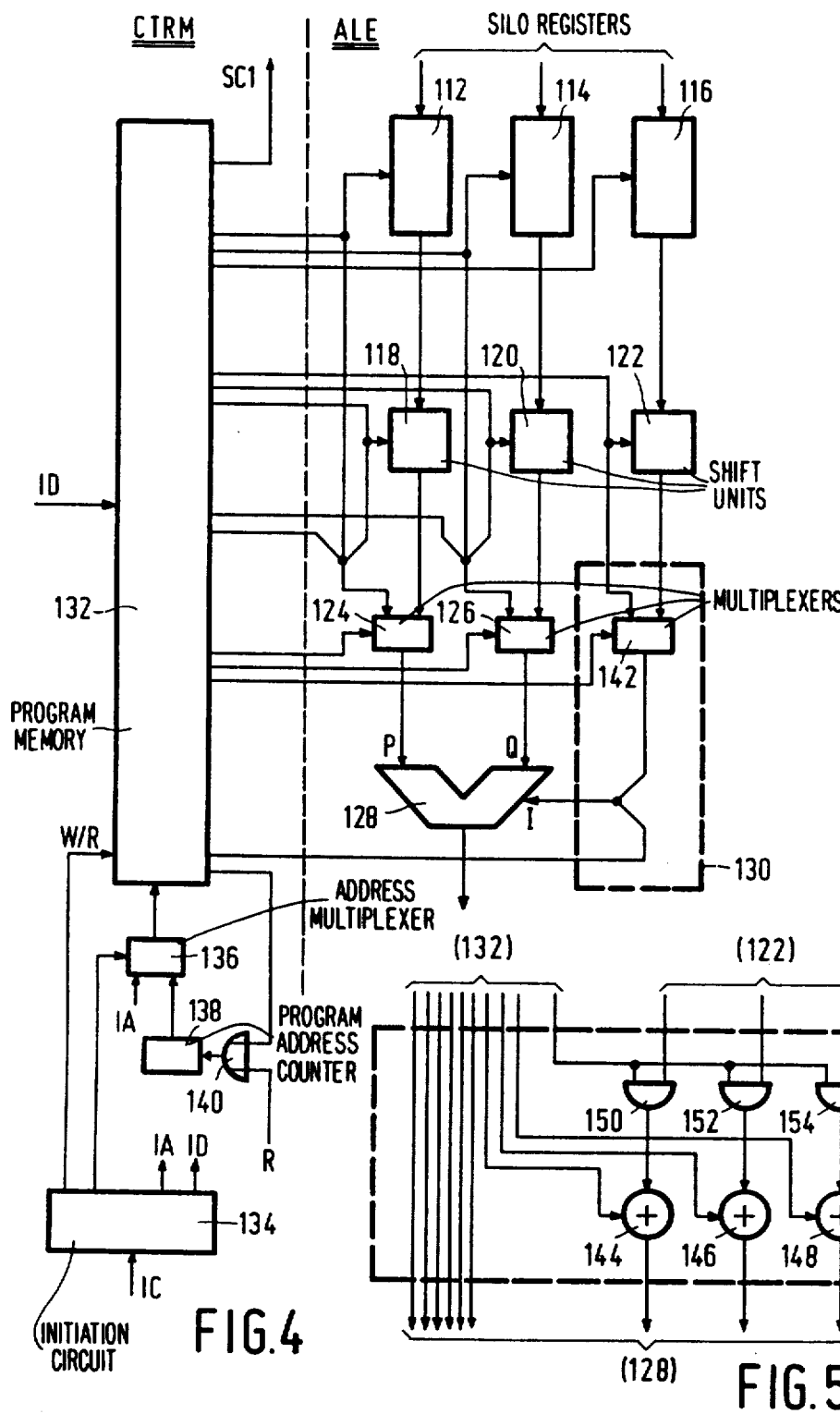
FIG. 4 shows an embodiment of an arithmetic and/or logic processor element of a processor module.

FIG. 4 shows to the right of the broken line the block diagram of an arithmetic and/or logic element (ALE) and to the left of the broken line the associated control element (CTRM). The ALE comprises three 12-bit inputs with a silo registers 112, 114 and 116, respectively, the outputs of which are connected to the shift units (SHA, SHB, SHC) 118, 120 and 122 respectively. The outputs of the shift units 118 and 120 are connected via multiplexers 124 and 126 respectively to the P and Q inputs respectively of a ALU 128. The shift unit 122 is connected via the combinatorial network 130 to the instruction input I of the ALU 128. All these components can be controlled from a program memory 132 in the control element CTRM. The CTRM further comprises an initiation circuit 134, an address multiplexer 136, a program address counter 138 and an OR gate 140.

The silo registers have a memory function for 32 words, writing taking place in a fixed sequence, while reading out takes place in a sequence determined by the program memory The write address is generated by a 5-bit counter belonging to the silo registers, while the read address is obtained by subtracting a relative read address (RAD) determined by the program memory from the write address. In this manner, delays are realised by the silo registers over RAD clock periods, RAD being a sign-free integer which may change every clock cycle. The silo registers can be written into and read out at the same time, but not at the same address, so that $0 < RAD \leq 31$. The 12-bit data words originating from the silo registers may be subjected to a shift operation determined by the program memory in the shift units 118 and 120. Twelve logic shift operations to the right, 12 logic shift operations to the left and 12 arithmetic shift operations to the right are, for example, possible; the 6-bit shift control signals may be fed in for this purpose from the program memory. The 12-bit data words originating from the shift units 118 and 120 are fed via the multiplexers 124 and 126 to the ALU 128, which delivers the ALE output signal. The ALU 128 may be controlled in the usual manner from the program memory and, to be specific, via the combinatorial network 130 by way of the I input, and performs the desired arithmetic and/or logic operations. The multiplexers 124 and 126 offer the possibility of replacing a data word by a constant from the program memory 132. This 12-bit constant can then, for example, be formed by the 5 bits which are otherwise used for the RAD delay, and the 6 bits which are otherwise used as shift control signal, plus 1 additional bit. The multiplexers 124 and 126 are controlled by a 1-bit control signal from the program memory. The program memory has capacity for 16 words of 55 bits, the 4-bit addresses being fed in via the address multiplexer 136. The program length is adjustable up to a length of not more than 16 steps and, to be specific, by making use of the reset facility of the program address counter 138, the reset signal delivered by the program memory being fed to said counter via the OR gate 140. The program counter may also be reset by the external reset signal R. Via the chip initiation control circuit 50, initiation and reprogramming data can be received which, for each data unit, are made up of a program memory address IA and initiation data ID. The addressing of the respective processor elements takes place at the same time by comparing an address entrained by the data units with an address introduced by hardware in the initiation circuit 134. The data units are fed serially over one wire of the IC connection, clock signals being delivered via the other wire of said connection in order to specify both the beginning and the end of the data units, and also the individual bits of said data units. In the initiation circuit 134, the serial data units are converted to parallel form and, to specific, into a 4-bit program memory address IA and 55-bit initiation data ID. These data are fed to the program memory 132. In this process, the program memory address flows via the address multiplexer 136. When a data unit has been received by the initiation circuit 134, the multiplexer 136 is activated so that the program memory address IA originating from said initiation circuit is transmitted, while a write signal W/R is emitted at the same time so that the data ID can be written into the program memory. Furthermore, attention should also be drawn to the fact that the program memory delivers the control signal SC1 for the crossbar switch.

The combinatorial network emits 9-bit instructions via the I input of the ALU 128. Said instructions are determined from words stored in the program memory and data words fed in from the crossbar switch via a channel specifically present for that purpose. Since conditional operations have to be made possible in the ALU 128 via said specific channel in which the silo register 116 and the shift unit (SHC) 122 are incorporated, it is not necessary to modify a respective instruction word from the program memory completely or to replace it by a data word fed in via the said specific channel; it is sufficient to modify or to replace only a few bits. In the combinatorial network a first instruction part is therefore determined by an equally long first section of a respective word stored in the program memory and an equally long data word part which is derived from a data word fed in from the crossbar switch, while the remaining instruction part is formed by the other section of the respective word stored in the program memory.

In FIG. 4, a combinatorial network 130 comprises a multiplexer 142 which, under the control of a 1-bit control signal from the program memory, either transmits a 3-bit first instruction part from the program memory or a 3-bit word part which is derived from the 12-bit data word fed in from the crossbar switch. The 6 bits of the remaining instruction part originate from the program memory alone.

Figure 5:
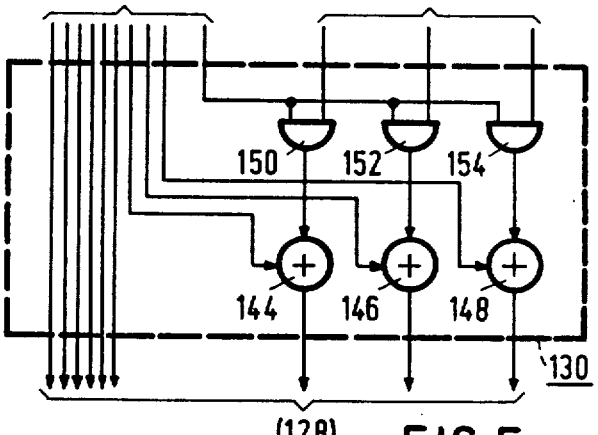
FIG. 5 shows a specific exemplary embodiment of the combinatorial network.

FIG. 5 depicts another embodiment of the combinatorial network. Here, too, 6 bits of the 9-bit instruction are determined by the program memory alone, the 3 bits of the instruction part being emitted by the exclusive-OR gates 144, 146 and 148 respectively. The combinatorial network furthermore comprises also three AND gates 150, 152 and 154. Said AND gates are controlled from the program memory. If the AND gates are disabled, the 9-bit instructions are completely determined by the program memory. If the AND gates are enabled, the 3 bits of the first instruction part are determined by a bit-wise combination of the 3 bits which are fed in from the program memory and the 3 bits which are derived from the data word fed in from the crossbar switch. In the shift unit 122, the 3 bits needed for the combinatorial network are selected from the 12-bit data word fed in. The shift unit 122 may be of identical construction to the shift units 118 and 120 and is likewise controlled from the program memory. If desired, this control may be such that, although a data word is fed to said shift unit, only logic zeros nevertheless appear at the output; in that case, the combinatorial network from FIG. 5 can be used with the AND gates omitted.

The memory processor elements 60 and 62 in FIG. 3 comprise, as already stated, a memory element ME and a control element CTRS. Said control element is of virtually identical construction to the control element CTRM of the arithmetic and/or logic processor element depicted in FIG. 4. For the present invention, however, a further description thereof is of no importance. This applies also to the gate processor element indicated in FIG. 3; this comprises five buffer elements constructed as silo registers which are all controlled independently of each other by a control circuit CTRGi, which is again of virtually identical construction to the control element CTRM of the arithmetic and/or logic processor element. The five control circuits CTRGi together form the control element 100 depicted in FIG. 3; the five buffer elements together form the output data buffer 98 depicted in FIG. 3.

There now follow some examples to demonstrate how conditional operations become possible in the ALE as a result of the measures according to the invention. This always involves instructions of the type "If . . . , then, else . . . ", which are realised in a program with the aid of branch instructions, which are in this case obtained with the aid of data word parts which are derived from data words fed in from the crossbar switch since the programs can only contain branch-free instructions.

The operations to be carried out in the ALU relate to addition, subtraction, logic functions, comparing functions and multiplications; to specify the most diverse categories of said operations, 6 bits are fed in from the program memory as "remaining instruction part", of which bits one relates to the symmetry of the P and Q input of the ALU. From the shift unit (SHC) 122, a 3-bit parameter code (r2, r1, r0) is fed in, which code forms the abovementioned "first instruction part".

The bits r2 and r1 are not of importance here for the various addition and subtraction, and logic and comparison functions; this is, however, the case for the diverse types of multiplications. For all the operations to be performed in the ALU, a conditional operation can be executed with bit r0; the value of r0 corresponds to whether a condition is satisfied or not which results in a different operation in the ALU.

The ALU can also be used as a switch. Suppose that in one or more arithmetic and/or logic processor elements of one or more processor modules in one or more data processor units, a first block of instructions has been executed which has led to a first result which is then fed to the P input of the ALU, while, in a similar manner, a second block of instructions has been executed with a second result which is then fed to the Q input of the ALU, the bit r0 can then specify which of the two results should be transmitted, i.e. emitted by the ALU. Programmatically, i.e. if the program were to contain branch instructions, the first or the second block of instructions can be executed after checking the condition; in this case both blocks of instructions should be carried out, after which bit r0 determines which result appears to be of importance. Attention should be drawn here to the fact that, since the various instruction blocks require a different period of time, a delay should be built in in order to be able to present the said first and second result simultaneously to the P and Q inputs respectively.

The arithmetic and/or logic processor elements may moreover function as, for example, a clock device, an address circuit, and so forth. A counting function may, for example, be realised by transmitting the data at the Q input to the ALU output as starting value for the counter and feeding back through the ALU output to the P input if r0=0, and by transmitting the data at the P input, increased by 1 in the ALU, to the ALU input if r0=1.

A specific application is furthermore, for example, the realisation of multiplcations; the diverse multiplication steps can be executed in several arithmetic and/or logic processor elements in parallel, after which the results thereof are combined in an arithmetic and/or logic processor element. Obviously, the multiplication can also be executed in one single arithmetic and/or logic processor element. If, for example, a modified Booth multiplication algorithm is executed, the multiplier $Y = y_{n-1}, y_{n-2}, \ldots, y_0$, where n is an even number, is fed from the cross bar switch to the shift unit (SHC) 122, which thereupon transmits, under control from the program memory, consecutive groups of 3 bits ($y_{2i+1}, y_{2i}, y_{2i-1}$, where $i = 0, 1, \ldots, \frac{1}{2} n-1$ and $y_{-1}=0$), which groups of bits form the consecutive "first instruction parts". The parameter code r2, r1, r0 now determines the operation which is executed in the ALU in accordance with the Booth multiplication algorithm; i.e., depending on the parameter code, P, P+Q, P−Q, P+2Q or P−2Q is transmitted, P representing the data on the P input and Q the data on the Q input. Attention should further be drawn to the fact that, to execute the operations P+2Q and P−2Q, the ALU comprises shift means to be used for this purpose. The parameter code in this case forms a combination of conditions which results in a conditional operation in the ALU. The multiplication number X is fed to the Q input, while the partial sum repeatedly formed in the ALU is fed to the P input after the former has been shifted two bit places to the right in the shift unit 118, in which connection it should be assumed that the ALU output counts just as many bits as the two ALU inputs and what matters here is the most significant part of the multiplication result. For this result, ultimately $\frac{1}{2} n - 1$ ALU operational steps are necessary.

The diverse conditional operations which can be executed in the ALU while the program memory contains only branch-free instructions, make it possible to use the otherwise mutually identical arithmetic and/or logic processor elements to form all kinds of functions without specific circuits being necessary therefor which is strongly conducive to the uniformity and simplicity in the architecture of the data processor system.

We claim:

1. A data processing system for processing signals presented at an input as a stream of digital data, comprising at least one data processing unit comprising:
   (a) at least one processor module comprising a plurality of processor elements disposed to function in parallel with one another, said processor elements including at least one processor element chosen from the group consisting of an arithmetic processor element, a logic processor element and a memory processor element;
   (b) a crossbar switch to which input signals for a first processor module and output signals from processor elements belonging to additional processor modules are supplied and from which input signals for said processor elements belonging to said additional processor modules and output signals from said first processor module are obtained, and from which a plurality of data words are obtained.
   said arithmetic and logic processor elements each further comprising:
   (i) a program memory coupled to said crossbar switch;
   (ii) constructing means coupled to said program memory and said crossbar switch, for obtaining from said crossbar switch, synchronously with said stream of digital data, said data words and for constructing a stream of instructions comprising portions of said data words and portions of words stored in said program memory, and
   (iii) an arithmetic logic unit having an instruction input for receiving said stream of instructions.

2. A data processor system according to claim 18, wherein a first part of an instruction is formed in said constructing means from a first section of a respective word of a given length stored in the program memory and an equally long data word part which is derived from a data word provided by said crossbar switch, and the remaining part of said instruction is formed by a second section of the respective word.

3. A data processor system according to claim 2, wherein said constructing means comprises a multiplexer, via which either the first section of said respective word or said data word part forms said first part of said instruction.

4. A data processor system according to claim 3, wherein the arithmetic and/or logic processor element comprises a shift unit in which data word parts are provided to the constructing means are selected from the data words fed in from the crossbar switch. ·

5. A video processor system for processing video signal samples on a real-time basis, provided with a data processor system according to claim 3, in which a clock device for controlling the data processor units has a frequency which has a fixed relationship to the sampling frequency of the video signal.

6. A data processor system according to claim 2, wherein said constructing means comprises a number of exclusive-OR gates and an equal number of AND gates, each of the bits of the first section of said respective word being fed to a corresponding exclusive-OR gate, while the bits of said data word part are fed to corresponding exclusive-OR gates via respective AND gates controlled from the program memory in a manner such that the output bits, forming the first part of said instruction, from the exclusive-OR gates are either equal to the bits of the first section of the respective word or form a bit-wise combination with the bits from said data word part.

7. A data processor system according to claim 6, wherein the arithmetic and/or logic processor element comprises a shift unit in which data word parts are provided to the constructing means are selected from the data words fed in from the crossbar switch.

8. A video processor system for processing video signal samples on a real-time basis, provided with a data processor system according to claim 6, in which a clock device for controlling the data processor units has a frequency which has a fixed relationship to the sampling frequency of the video signal.

9. A data processor system according to claim 2, wherein the arithmetic and/or logic processor element comprises a shift unit in which data word parts are provided to the constructing means are selected from the data words fed in from the crossbar switch.

10. A video processor system for processing video signal samples on a real-time basis, provided with a data processor system according to claim 2, in which a clock device for controlling the data processor units has a frequency which has a fixed relationship to the sampling frequency of the video signal.

11. A data processor system according to claim 1, wherein the arithmetic and/or logic processor element comprises a shift unit in which data word parts are provided to the constructing means which are selected from the data words fed in from the crossbar switch.

12. A video processor system for processing video signal samples on a real-time basis, provided with a data processor system according to claim 11, in which a clock device for controlling the data processor units has a frequency which has a fixed relationship to the sampling frequency of the video signal.

13. A data processor system according to claim 1, wherein the arithmetic and/or logic processor element comprises a shift unit in which data word parts are provided to the constructing means which are selected from the data words fed in from the crossbar switch, said shift unit is furthermore controllable from the program memory in a manner such that only logic zeros appear at the output thereof, and in that the constructing means is provided with exclusive-OR gates, each of the bits of the first section of a word stored in the program memory and each of the bits of a data word part is fed to a corresponding exclusive-OR gate, the shift unit being controlled in a manner such that the output bits, forming a first instruction part, from the exclusive-OR gates are either equal to the bits of the first section of a respective word stored in the program memory or a bit-wise combination with the bits of said data word part.

14. A video processor system for processing video signal samples on a real-time basis, provided with a data processor system according to claim 13, in which a clock device for controlling the data processor units has a frequency which has a fixed relationship to the sampling frequency of the video signal.

15. A video processor system for processing video signal samples on a real-time basis, provided with a data processor system according to claim 1, in which a clock device for controlling the data processor units has a frequency which has a fixed relationship to the sampling frequency of the video signal.

16. A data processor system according to claim 2, wherein the arithmetic and/or logic processor element comprises a shift unit in which data word parts are provided to the constructing means which are selected from the data words fed in from the crossbar switch, said shift unit is furthermore controllable from the program memory in a manner such that only logic zeros appear at the output thereof, and in that the constructing means is provided with exclusive-OR gates, each of the bits of the first section of a word stored in the program memory and each of the bits of a data word part is fed to a corresponding exclusive-OR gate, the shift unit being controlled in a manner such that the output bits, forming a first instruction part, from the exclusive-OR gates are either equal to the bits of the first section of the respective word stored in the program memory or a bit-wise combination with the bits of said data word part.

* * * * *